United States Patent [19]

Grieb

[11] Patent Number: 4,945,811
[45] Date of Patent: Aug. 7, 1990

[54] WEAPON SYSTEM

[75] Inventor: Hubert Grieb, Germering, Fed. Rep. of Germany

[73] Assignee: MTU Motoren- und Turbinen-Union Munchen GmbH, Fed. Rep. of Germany

[21] Appl. No.: 340,927

[22] Filed: Apr. 20, 1989

[30] Foreign Application Priority Data

Apr. 28, 1988 [DE] Fed. Rep. of Germany ....... 3814454

[51] Int. Cl.$^5$ .............................................. F41B 6/00
[52] U.S. Cl. ....................... 89/8; 60/39.33; 60/39.75
[58] Field of Search ............. 60/39.33, 39.54, 39.75; 89/8; 124/3; 318/135; 415/103, 115

[56] References Cited

U.S. PATENT DOCUMENTS

| | | | |
|---|---|---|---|
| 1,149,252 | 8/1915 | Dianovszky | 60/39.75 |
| 2,647,368 | 8/1953 | Triebbnigg et al. | 60/39.54 |
| 2,759,327 | 8/1956 | Huber | 60/39.33 |
| 4,147,025 | 4/1979 | Friedrich et al. | 60/39.06 |
| 4,197,700 | 4/1980 | Jahnig | 60/39.04 |
| 4,314,442 | 2/1982 | Rice | 60/39.75 |
| 4,656,918 | 4/1987 | Rose et al. | 89/8 |
| 4,729,218 | 3/1988 | Haselbauer et al. | 60/39.33 |
| 4,840,107 | 6/1989 | Weldon | 89/8 |
| 4,841,185 | 6/1989 | Weldon | 310/93 |

FOREIGN PATENT DOCUMENTS

| | | |
|---|---|---|
| 0139768 | 3/1903 | Fed. Rep. of Germany . |
| 0376391 | 5/1923 | Fed. Rep. of Germany . |
| 2250803 | 4/1974 | Fed. Rep. of Germany . |

OTHER PUBLICATIONS

Heppenheimer, T. A., "Electromagnetic Guns", Popular Science, Aug. 1987, pp. 54–58.
"Entwicklung Der Kraftwerks-Gasturbine", BWK, Bd. 37, (1985), Nr. 5, Mar., pp. 213–217.
W. P. Auer, Baden Entwicklung der Kraftwerks-Gasturbine.

Primary Examiner—Stephen C. Bentley
Attorney, Agent, or Firm—Evenson, Wands, Edwards, Lenahan & McKeown

[57] ABSTRACT

An energy supply system for mobile electric weapons, for the operation of a storage unit, has a turbine which can be acted upon for a short time by a combustion chamber with hot gas of a high pressure and temperature. In the idling operation, the turbine is maintained at an idling speed by exhaust gas from a vehicle driving system. As a result, a fast charging of the storage unit is achieved, and at the same time, the space requirement of the storage unit and of the energy generating device is reduced.

11 Claims, 3 Drawing Sheets

WEAPON SYSTEM

BACKGROUND AND SUMMARY OF THE INVENTION

The present invention generally relates to a mobile weapon system, and more particularly to a mobile weapon system including an electrically operated gun and an energy supply arrangement wherein energy can be stored in a storage unit and can be supplied to the gun as electric energy when required for firing or shooting.

Previously used ballistic weapons have been based on the principle that a missile located in a gun barrel is accelerated by an explosion-like propellant combustion. Such gas pressure weapons have the disadvantage that the muzzle velocity cannot be increased to above approximately 1,800 m/sec for physical reasons because the maximum achievable muzzle velocity is limited by the highest possible gas expansion rate. Thus, gas pressure weapons generally have the disadvantage of relatively long missile flying times, which has a negative effect, despite the availability of precise target acquisition systems, particularly when fighting remote, fast-moving targets, such as airplanes and helicopters.

From German patents (DE-PS) 139 768 and 376 391, weapons have become known, in which the missile acceleration takes place by means of the Lorenz force, therefore electrically. Guns of this type are not bound by any practical limits with respect to their muzzle velocity, and muzzle velocities of more than 10,000 m/sec. have already been reached.

However, it is a problem in the case of electric weapons of this type that for a very short time period (order of 1 msec), extremely high power must be available for the acceleration of the missile. The required power is in the range of gigawatts, and the energy to be supplied to the missile is in the range of megajoules, if missiles of a significant mass, for example, several kilograms, are to be accelerated. In this case, for reasons of air resistance, muzzle velocities of up to 4,000 m/sec. are sensible.

In order to store such large amounts of energy, a static electric storage device is contemplated, for example, in the form of a capacitor charged by a generator. As an alternative, kinetic energy storage devices have been known, in which energy is stored in the form of rotational energy, in a centrifugal mass coupled with a generator. When the centrifugal mass is braked, the energy can be drawn as electric energy at the generator winding, and, for example, by an inductive intermediate storage device, can be supplied to the electric weapon for the forming of pulses.

Although, with the latter method, the required energy can be made available within a foreseeable time period, the problem exists that the requirement of firing a number of shots within a short sequence cannot be met, since up to now, no possibilities have existed for a fast storage device regeneration. With conventional power engines which, if they have an acceptable weight and size, generate a power of up to one megawatt, the "recharging" after each shot would take so long that either a shot could be fired only approximately every minute, or enormous storage systems would be required for the storage of energy for a large number of shots. While the former possibility would be unacceptable for reasons of military tactics, the latter possibility would enlarge the required storage space or the storage mass to such an extent that it could not be implemented even in the case of battle tanks.

It is, therefore, an object of the present invention to provide a weapon system which utilizes electrical energy to accelerate a projectile and which is capable of firing a fast sequence of shots while, in each case, only that energy is to be stored that is required for one or a few shots.

It is yet another object of the present invention to generate the required energy for operating the weapon system within a very short time period which is in the range of a few seconds.

According to the invention, these and other objects are achieved by a special adaptation of a turbine arrangement which is provided to charge an energy storage unit for supplying energy to the gun of the mobile weapon system.

Important advantages of the weapon system according to the invention include that, for a very short time, which amounts to approximately two to four seconds, a very high power can be achieved, whereby, during this time, the storage unit can be charged to energies in the range of approximately 50MJ, and thus missiles of considerable mass can be fired after this charging time. This feature makes it possible to limit the storage requirement to the amount of energy of one or a few shots (battle tank cannon), without the occurrence of unacceptable charging times. This feature further makes it also possible to reduce the storage unit size to such an extent that it can be housed in a combat vehicle. In addition, the energy supply unit according to the invention itself requires little space and is of an only negligible weight when compared with the required fuel, driving and storage masses.

By means of the combination of characteristics according to the invention, the power of the turbine can advantageously be increased for a short time to values higher than 15 MW, so that such short charging times can be achieved. Advantageously, in this case, the turbine entry temperature is increased considerably above the permissible component temperatures, which, however, in view of the short full load periods and the thermal conductivity delay to the component core, does not lead to a destruction of components.

In an advantageous further feature of preferred embodiments of the present invention, the storage unit is constructed as a kinetic storage device which has a centrifugal mass and a generator winding, in which case, when required (shot), rotational energy which is stored in the centrifugal mass by an outside wiring of the generator winding can be transmitted as electric energy. This feature has the advantage that the turbine is taken up to full load for a short time in order to achieve combat readiness, whereby the centrifugal mass is driven up to nominal speed. Subsequently, the turbine may be controlled down to idling speed or to a stop, in which case the energy remains stored in the centrifugal mass, and combat readiness is therefore maintained. With the firing of a shot, the centrifugal mass is decelerated from its nominal speed to a lower rotational speed, which preferably corresponds to approximately the idling speed of the turbine. As the result of the brief full load of the turbine, the centrifugal mass, again within two to four seconds, can be brought to the nominal speed, and thus be made ready for another shot.

In another advantageous further feature of preferred embodiments of the present invention, an overrunning clutch is provided between the turbine shaft and the storage unit, this overrunning clutch being disengaged when the turbine speed is lower than the storage device speed. As a result, it is achieved in a simple manner that the storage device speed is maintained when the turbine speed is reduced, and the turbine drives the storage device to nominal speed during the running-up. Advantageously, the combustion chamber of the turbine is acted upon by a self-igniting combination of liquid fuel and liquid oxydant, whereby the conditions required for the operation of the turbine can be achieved with a short delay.

In an alternative embodiment of the invention, the combustion chamber can be ignited by a self-igniting fuel oxidant mixture and subsequently can be converted to kerosene (Diesel oil) as the fuel. As a result, with a fast ignition, the amount of the required special fuel is reduced, which has a particularly advantageous effect when it is used in connection with a vehicle driving system burning kerosene or Diesel oil.

According to yet another advantageous further feature of preferred embodiments of the present invention, the turbine is constructed in two parts. The combustion chamber is arranged between the turbine parts, which operationally are connected in parallel, in such a manner that the fuel gas flow generated in the combustion chamber is deflected into two partial flows directed in opposite directions, which act upon the turbine parts. As a result, a compact construction can be achieved which requires little space and in which case, at the same time, the gas forces of the turbine parts directed in an axial direction of the shaft cancel one another, and as a result, relieve the shaft bearing of the turbine shaft of unwanted wear and stress.

The turbine parts are preferably constructed in five stages respectively, whereby a thermodynamically advantageous conversion of energy can be achieved in the turbine.

According to still another advantageous further feature of preferred embodiments of the present invention, the combustion chamber is constructed as a single-tube combustion chamber and is connected with the turbine by a ring duct. This permits a simple, rugged construction that can be serviced easily.

Advantageously, water may also be injected into the combustion chamber for use as ballast, As a result, the gas volume can advantageously be increased to the permissible extent while the gas temperatures are reduced at the same time.

A preferred feature of certain embodiments of the present invention also provides that the injection of fuel, oxidant and water takes place by utilizing pumps which are constructed as controllable displacement pumps and can be driven by one or several hydraulic or electric motors. As a result, high combustion chamber pressures can be achieved with short run-up times.

A further feature of preferred embodiments of the present invention provides that the combustion chamber, the ring duct, the blading of the first or of the first two turbine stage(s) as well as the walls acted upon by the hot gas, are lined on the inside with heat-resistant insulating layers. The heat capacity of the insulating layers is chosen to be such that the maximally permissible component temperatures, at significantly higher combustion chamber temperatures, will not be reached until after a plurality of charging cycles, i.e., a time longer than approximately 15 seconds. This has the advantage that a plurality of shots can be fired in short succession, the turbine during this time running at full load. For example, in the case of a succession of five shots, the turbine will run at full load for approximately 15 seconds and subsequently will run down.

Another advantage is the fact that the rotating turbine parts, particularly, for example, the turbine shaft and the blading, in this case, also operate as energy storage devices. As a result of the heat capacities of the insulating layers, it is prevented in this case that, during this time, the component temperatures become too high.

In an advantageous further feature of preferred embodiments of the present invention, the rotor blades of the first or of the first two turbine stage(s) can be cooled by water from the provided ballast quantity, which can be supplied, for example, through the free end of the turbine shaft and discharged from the rotor blades at their trailing profile edges. This advantageously permits a simultaneous effective cooling of the rotor blades and the admixing of part of the water ballast.

Likewise, the guide blades of the first or the first two turbine stage(s) can be cooled by water from the provided ballast quantity, in which case the water can be supplied, for example, through the turbine housing and discharged from the guide blades at their trailing profile edges. As a result, the above-mentioned advantages can also be achieved for the guide blades of the turbine.

In an advantageous further feature of preferred embodiments of the present invention, the weapon system is housed in a combat vehicle which is driven by a separate vehicle driving system. This makes it possible that the high driving power required in the operation of the vehicle and the energy supply to the electric weapon can be achieved simultaneously.

Preferably, exhaust gas from the vehicle driving system can be supplied to the combustion chamber through a blockable gas line, in which case the turbine can be maintained at an idling speed. As a result, the exhaust gas of the vehicle driving system can advantageously be used for maintaining the turbine at such a rotational speed which permits a fast running-up to full load. The idling speed is approximately in the range of 80% of the full load speed, for the purpose of which a power in the range of 0.10% of the power at full load is required.

Advantageously, the vehicle driving system has an internal-combustion-engine-driven driving generator, which, by means of a control element, feeds one or several driving motors, the static electric storage device being selectively chargeable from the driving engine by a change-over switch. As a result, an increased redundancy of the weapon system is made possible, particularly during a failure of the turbine sYstem. Although, in this case, the time required for the charging of the storage unit would be much longer, a limited operatability of the combat vehicle is maintained. As an alternative, when the vehicle driving system fails, the energy stored in the storage unit or the power available in the charging assembly, with a corresponding adaptation, can be used for driving the driving motors, thereby ensuring a mobility of the damaged vehicle over a moderately short path.

In an alternative embodiment of the present invention, the generator winding of the storage unit, which is wired as a motor, can be acted upon by the driving generator of the vehicle driving system in order to accelerate the centrifugal mass. By means of this reversed wiring of the generator winding, a redundancy, i.e., a limited operability of the electric weapon, is also maintained when the turbine fails.

DETAILED DESCRIPTION OF THE DRAWINGS

Figure 1:
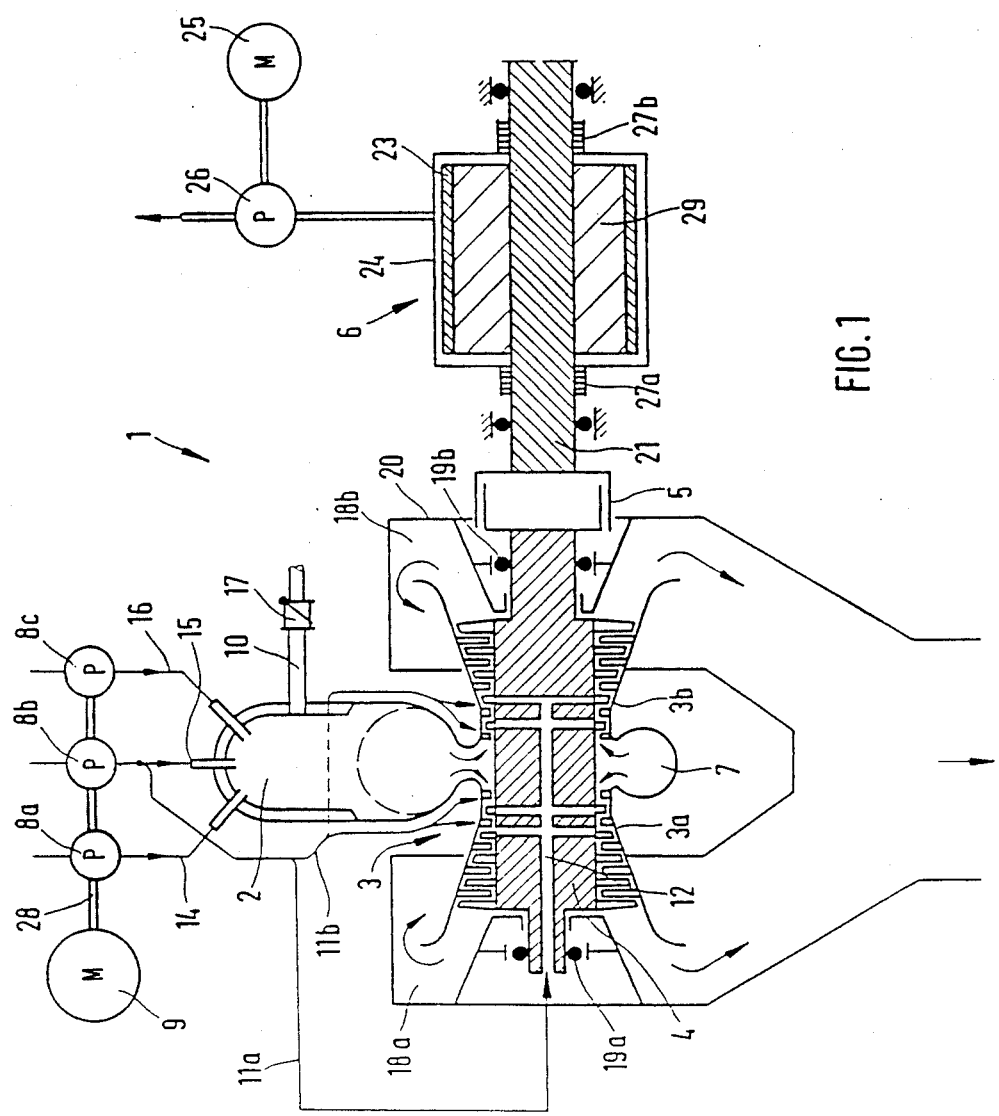
FIG. 1 is a schematic, sectional view of an energy supply arrangement construction in accordance with a preferred embodiment of the present invention.
Figure 3:
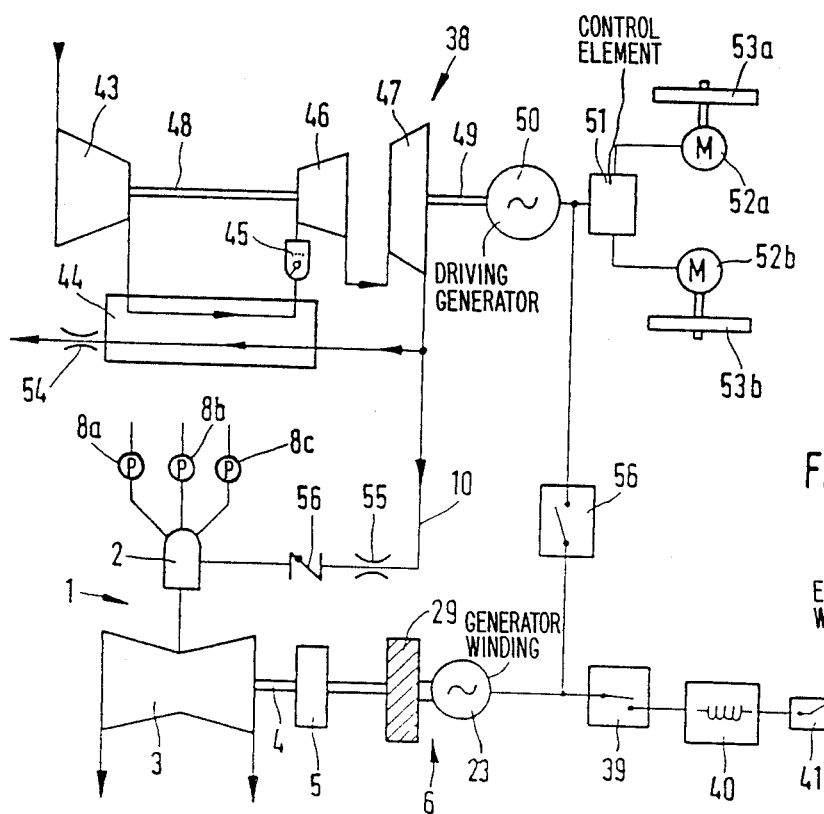
FIG. 3 is a schematic representation of an energy supply arrangement constructed in accordance with preferred embodiments of the present invention with a driving system for mobile weapon system.
Figure 4:
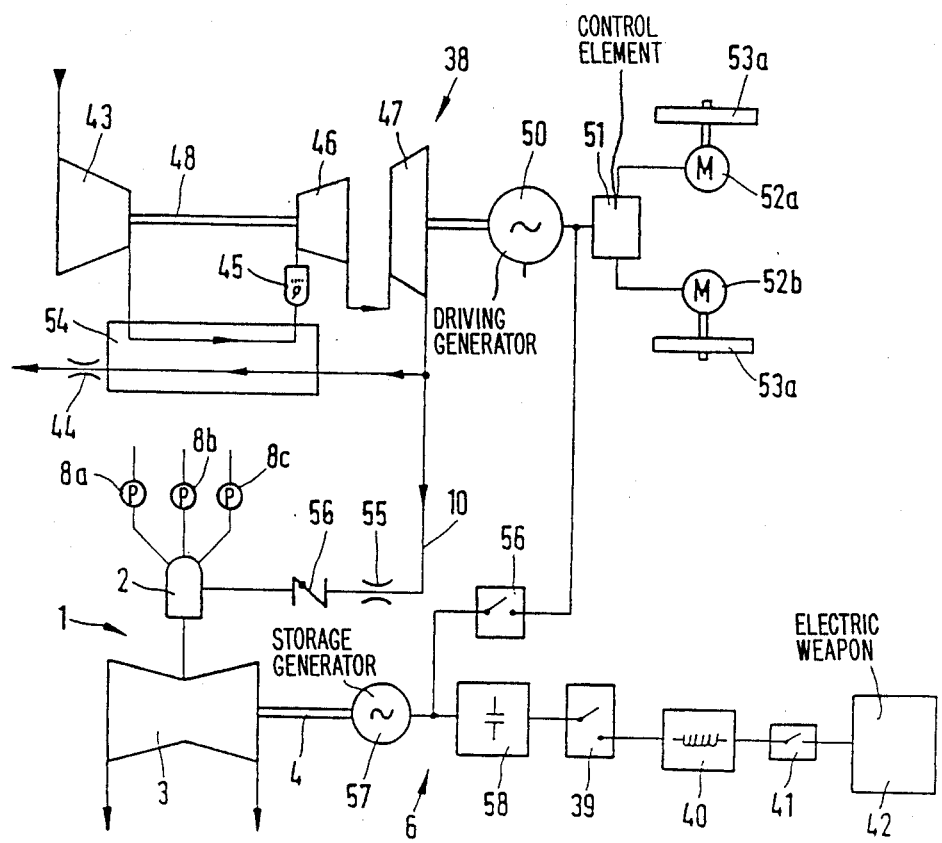
FIG. 4 is a schematic view of an alternative embodiment of an energy supply arrangement constructed in accordance with preferred embodiments of the present invention with a driving mechanism for mobile weapon system.

FIG. 1 is a schematic, axial view of an energy supply arrangement 1, which includes a combustion chamber 2, a turbine 3 and a storage unit 6. Fuel, water and an oxidant are supplied to the combustion chamber 2 by means of the pumps 8a, 8b, 8c and the fuel lines 14, the water pipe 15 and the oxidant pipe 16. A gas line 10, which can be shut off by means of the flap valve 17, of a driving system such as a vehicle drive system which is shown in FIG. 3 or 4, acts upon the combustion chamber 2 during idling. This gas line 10 supplies gas in a ready state for the energy supply system or for the purpose of starting the same by means of exhaust gas from the driving units of the vehicle drive system.

The combustion gas from the combustion chamber 2 reaches the symmetrically constructed two-stage turbine through the ring duct 7. After having passed the five-stage partial turbine 3a and 3b, the exhaust gas reaches the exhaust gas ducts 18a, 18b and from there is conveyed outboard. The turbine 3 is mounted on a turbine shaft 4, which is in turn housed in the turbine housing 20 by means of the bearings 19a, 19b.

An overriding clutch 5 is flanged to the turbine shaft 4, this overriding clutch 25 being in turn coupled with a storage shaft 21 of the storage unit 6. The storage shaft 21 is borne in a separate storage housing 24 by means of the bearings 22a, 22b. The storage unit 6 is arranged on the storage shaft 21 and includes a generator winding 23 which is housed together with a centrifugal mass 29 in a storage housing 24 in a gastight manner. For the purpose of evacuating the storage unit 6, a vaccum pump 26 is connected, which is driven by a motor 25. The interior of the storage unit 6 is also sealed off with respect to the environment in a gastight manner by seals 27a, 27b.

Pumps 8a, 8b, 8c, which are preferably constructed as a displacement pump are connected by a common shaft 28 with a hydraulic or electric motor 9.

A branching in the water pipe 15 is provided behind the water pump 8b by pipes 11a and 11b by which part of the water can be added to the process as ballast, by pipes 11a and 11b, is supplied to the turbine parts 3a and 3b as cooling water. In this case, pipe 11a is connected with a cooling water bore 12 arranged in the center of the turbine shaft 4, this cooling water bore 12, in turn, communicating preferably with the first or with the first two rows of rotor blades of the turbine parts 3a and 3b. Pipe 11b is preferably connected with the guide blades of the first or the first two rows of guide blades of the turbine parts 3a and 3b.

Figure 2:
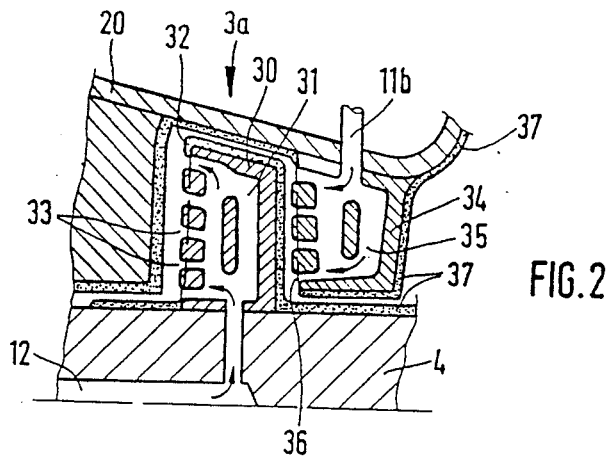
FIG. 2 is an enlarged axial sectional view of a portion of the turbine of the FIG. 1 arrangement.

FIG. 2 is a partial, axial sectional view of the first stages of the partial turbine 3a, which is constructed to be identical to partial turbine 3b. In this Figure, the turbine shaft 4 is shown with one of the guide blades 30 of the first turbine stage connected to it. The cooling water bore 12 provided in the interior of the turbine shaft 4 communicates with the hollow interior space 31 of the guide blade 30 in such manner that, during the operation, cooling water flows in, which flows through the interior space 31, and flows out through the outlet openings 33 provided at the trailing profile edge 32 of the blade 30, and is admixed to the gas flow. A guide blade 34 of the first turbine stage is constructed analogously, in which case, by means of pipe 11b, cooling water is supplied to the hollow space 35, which leaves the guide blade 34 at the outlet openings 36.

The turbine components, which are acted upon by hot gas, particularly rotor blades 30 and guide blades 34 as well as the interior side of the turbine housing 20 and the turbine shaft 4, are covered with heat-resistant insulating layers 37, in order to protect these components for a short period from the high hot-gas temperatures. The insulating layers 37 may be applied in the desired thickness according to known methods. Layers with zirconium oxide and/or other suitable materials, for example, which adhere well and have a low thermal conductivity, are suited for this purpose. These may be applied by thermal spraying or other known methods. In this Figure, the stationary components, such as the turbine housing 20 and the guide blades 34, are provided with layers of a thickness of several millimeters, and the rotating components, particularly the rotor blades 30, are provided with layers of a thickness of approximately 0.3 to 0.7 mm, according to the temperature gradient and the material.

FIG. 3 is a schematic representation of the energy supply arrangement 1 in combination with a driving system 38 of a combat vehicle, which is not shown in detail. The energy supply arrangement includes the elements shown in FIG. 1, i.e., the combustion chamber 2, the turbine 3, the overruning clutch 5 and the storage unit 6. The storage unit 6, in this case, includes a schematically shown centrifugal mass 29 and the generator winding 23. The combustion chamber 2 is acted upon by fuel, water and oxidant by means of pumps 8a, 8b, 8c. The generator winding 23 is connected with an electric weapon 42 which is not shown in detail by a switch 39, an inductive intermediate storage device 40 and a switch 41.

For the firing of a shot, the switch 41 is closed, whereby the rotational energy stored in the centrifugal mass 29 is converted to electric energy by the generator winding 23 and is converted to a pulse which is suitable for the operation of the electric weapon 42 by the intermediate storage device 40. In this case, switch 39 is in the position shown in FIG. 3.

The combat vehicle driving system 38 includes a compressor 43, a heat exchanger 44, a driving combustion chamber 45, a gas generator turbine 46 and a power turbine 47, the gas generator turbine 46 being coupled with the compressor 43 by a shaft 48. The power turbine 47 is connected with a driving generator 50 by means of a shaft 49. This driving generator 50 is electrically connected by a control element 51, with two electric drive motors 52a, 52b which, in turn, mechanically drive the driving wheels 53a and 53b of the vehicle.

During operation, fresh air is taken into the compressor 43 and is compressed, is then preheated in the heat exchanger 44 and is burnt with fuel in the driving combustion chamber 45. After driving the gas generating turbine 46 and the power turbine 47, the exhaust gas is supplied to the heat exchanger 44 and leaves the system after passing through a throttle valve 54.

A part of the exhaust gas reaches the combustion chamber 2 through the gas pipe 10 via a throttle valve 55 and a flap valve 56, and acts upon the combustion chamber 2 of the energy supply arrangement 1. As a result, the turbine 3 is maintained at an idling speed, and, in this manner, permits a fast running-up to the nominal speed during the operation of the electric weapon 42. The adjustment of the exhaust gas throughput through the gas pipe 10 takes place by the throttle valves 54 and 55 which, for this purpose, are connected with a control unit, which is not shown.

When the switch 56 is in its closed switching position, the generator winding 23 is connected with the generator 50 and the control element 51. As a result, it is possible that, when the turbine 3 fails, by means of the generator 50, the centrifugal mass 29 is accelerated by the fact that the generator winding 23 is acted upon so as to operate like a motor. When the driving system 38 fails, the energy stored in the centrifugal mass 29 can be used for the short-term driving of the drive motors 52a, 52b, to the extent that the electric parameters are adapted.

The schematic representation of an alternative embodiment of the energy supply arrangement 1 shown in FIG. 4 in combination with the vehicle driving system 38 is essentially constructed like the system shown in FIG. 3, in which case, however, the storage unit 6 is constructed as a storage generator 57 coupled with the turbine 3, this storage generator 57 being electrically connected with a static electric storage device 58, in the form of a capacitor. In this case, the redundancy of the overall system can be achieved by the fact that, when the switch 56 is in the closed position, the storage device 58 can be charged by the driving generator 50. As an alternative, the energy located in the storage device 58 may also be used for driving the drive motors 52a, 52b.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A weapon system including an electrical energy supply means for supplying electrical energy to fire an electrically operated gun, said electrical energy supply means comprising:

a turbine drive non-continuously at full power by exhaust gases from a combustion chamber which is supplied by combustable fuel means and oxidant means, the exhaust gases having a pressure of equal to or greater than 70 bar and a temperature of equal to or greater than 1,300 K., the temperature and pressure being higher than possible during continuous operation of the turbine in order to produce a larger power output in a short period of time; and electrical energy storage unit means operatively coupled to the turbine for storing mechanical energy of the turbine as said electrical energy;

whereby the electrical supply means produces a large amount of power in a short period to quickly recharge the electrical energy storage unit means for the electrically operated gun.

2. A weapon system according to claim 1, wherein the electrical energy storage unit means is constructed as a kinetic storage unit which has a centrifugal mass and a generator winding, the kinetic storage unit transmitting rotational energy as electrical energy by an exterior wiring of the generator winding.

3. A weapon system according to claim 1, wherein the electrical energy storage unit means includes a turbine-coupled storage generator which feeds a static electric storage device.

4. A weapon system according to claim 1, wherein the combustion chamber is ignited by a self-igniting combination of liquid fuel and liquid oxidant.

5. A weapon system according to claim 1, wherein the combustion chamber is ignited by a self-igniting fuel/oxident mixture and subsequently combustion in the combustion chamber is maintained by kerosene as fuel.

6. A weapon system according to claim 1, wherein the turbine is a double flow turbine having the combustion chamber arranged between partial turbine parts which are connected in parallel so that combustion gas flow generated in the combustion chamber is deflected into two partial flows directed in substantially opposite directions to act upon the partial turbine parts.

7. A weapon system according to claim 1, wherein the turbine further includes cooling means for cooling elements of the turbine subjected to heat from the operation of the turbine and insulating means for insulating elements of the turbine from heat produced by the turbine during operation.

8. A weapon system according to claim 1, wherein the weapon system is housed at a combat vehicle which is driven by a separate driving system.

9. A weapon system according to claim 8, further comprising exhaust gas conducting means for conducting exhaust gas from the separate driving system to the combustion chamber to maintain the turbine at an idling speed.

10. A weapon system according to claim 8, wherein the separate driving system has an internal combustion engine for driving a driving generator, which, by a control element, feeds at least one driving engine of the vehicle, the electrical energy storage unit means being chargeable by the driving generator.

11. A weapon system according to claim 8, wherein the separate driving system is driven by a gas turbine engine.

* * * * *